US007483101B2

(12) United States Patent
Lim et al.

(10) Patent No.: US 7,483,101 B2
(45) Date of Patent: Jan. 27, 2009

(54) TRANSREFLECTION-TYPE LIQUID CRYSTAL DISPLAY DEVICE AND METHOD OF FABRICATING THE SAME

(75) Inventors: Byoung Ho Lim, Kyongsangbuk-do (KR); Seong Hee Kim, Kyongsangbuk-do (KR); Chul Nam, Gangwon-do (KR); Jong Woo Park, Taegu-kwangyokshi (KR); Gyu Bong Kim, Taegu-kwangyokshi (KR)

(73) Assignee: LG Display Co., Ltd., Seoul (KR)

( * ) Notice: Subject to any disclaimer, the term of this patent is extended or adjusted under 35 U.S.C. 154(b) by 32 days.

(21) Appl. No.: 11/649,780

(22) Filed: Jan. 5, 2007

(65) Prior Publication Data

US 2007/0109475 A1 May 17, 2007

Related U.S. Application Data

(62) Division of application No. 10/747,073, filed on Dec. 30, 2003, now Pat. No. 7,161,648.

(30) Foreign Application Priority Data

Apr. 15, 2003 (KR) .......................... 10-2003-23654

(51) Int. Cl.
*G02F 1/1335* (2006.01)
(52) U.S. Cl. .................... 349/114; 349/113; 349/138
(58) Field of Classification Search ................. 349/114, 349/113, 138
See application file for complete search history.

(56) References Cited

U.S. PATENT DOCUMENTS

| 6,208,395 | B1 | 3/2001 | Kanoh et al. |
| 6,255,130 | B1 | 7/2001 | Kim |
| 6,400,431 | B1 | 6/2002 | Morio et al. |
| 6,697,138 | B2 | 2/2004 | Ha et al. |
| 6,919,945 | B2* | 7/2005 | Ha .............................. 349/114 |
| 6,961,111 | B1 | 11/2005 | Kuramasu |
| 2002/0105604 | A1* | 8/2002 | Ha et al. ....................... 349/43 |
| 2002/0113927 | A1 | 8/2002 | Ha et al. |
| 2005/0094067 | A1 | 5/2005 | Sakamoto et al. |

FOREIGN PATENT DOCUMENTS

| JP | 2002-023181 | 1/2002 |
| JP | 2002-072229 | 3/2002 |

* cited by examiner

*Primary Examiner*—David Nelms
*Assistant Examiner*—Thanh-Nhan P Nguyen
(74) *Attorney, Agent, or Firm*—Morgan, Lewis & Bockius LLP

(57) ABSTRACT

A transreflection-type liquid crystal display (LCD) device includes a plurality of gate and data lines on a substrate crossing each other defining a plurality of pixel regions, a plurality of storage lines parallel to the gate lines, each storage line positioned between the gate lines, a plurality of thin film transistors disposed at the crossings of the gate and data lines, each thin film transistor having source and drain electrodes and a U-shaped channel region, a negative-type organic insulating layer within the pixel region except for a transmission part, the negative type organic insulating layer having at least one of concave and convex patterns thereon, a reflective electrode on the negative-type organic insulating layer within the pixel region except for the transmission part, and a transparent electrode within the pixel region in electrical contact with the drain electrode.

20 Claims, 14 Drawing Sheets

TRANSREFLECTION-TYPE LIQUID CRYSTAL DISPLAY DEVICE AND METHOD OF FABRICATING THE SAME

This application is a Divisional of U.S. patent application Ser. No. 10/747,073 filed Dec. 30, 2003, now U.S. Pat. No. 7,161,648 (now allowed) and claims the benefit of the Korean Application No. P2003-23654 filed on Apr. 15, 2003, both of which are hereby incorporated by reference in their entirety.

BACKGROUND OF THE INVENTION

1. Field of the Invention

The present invention relates to a liquid crystal display (LCD) device and a method of fabricating an LCD device, and more particularly, to a trans-reflection type LCD device and a method of fabricating a trans-reflection type LCD device.

2. Discussion of the Related Art

As demand for various types of display devices increases, efforts have been made to develop various flat display devices, such as liquid crystal display (LCD) devices, plasma display panel (PDP) devices, electroluminescent display (ELD) devices, and vacuum fluorescent display (VFD) devices. Currently, some type of the flat display devices have been incorporated into various display equipment.

Among the various types of flat display devices, the LCD devices have been commonly used in portable devices due to their advantageous characteristics, such as thin profile, light weight, and low power consumption. Thus, the LCD devices are commonly substituted for cathode ray tube (CRT) display devices. In addition, the LCD devices have been developed for computer monitors and television systems to receive and display broadcast signals.

The LCD devices are usually driven by making use of optical anisotropy and polarizing characteristics of liquid crystal molecules of liquid crystal materials. The liquid crystal molecules have long and thin structures, whereby it is possible to align the liquid crystal molecules along a specific direction. For example, when an electric field is induced to the liquid crystal material, the liquid crystal molecules become aligned along the specific direction. Thus, by controlling the alignment direction of the liquid crystal molecules, light is refracted according to the alignment direction of the liquid crystal molecules, thereby displaying an image.

The LCD devices are classified into one of reflective-type LCD devices and transmitting-type LCD devices. In the transmitting-type LCD devices, light is emitted from a backlight and transmitted to an LCD panel, thereby displaying an image. However, in the reflective-type LCD devices, ambient or front light is reflected within a reflecting plate of an LCD panel to display an image.

In general, a transreflection-type LCD device selectively uses both a transmission and reflection method to display an image. For example, the transreflection-type LCD device uses light emitted from a backlight, and ambient light or a light source, thereby decreasing power consumption.

FIG. 1 is a perspective view of a transreflection-type LCD device according to the related art. In FIG. 1, a transreflection-type LCD device includes upper and lower substrates 10 and 20 facing each other, and a liquid crystal layer 30 between the upper and lower substrates 10 and 20. In addition, a black-matrix layer 11 is formed on the upper substrate 10 to shield portions, except for pixel regions of the lower substrate 20, from the light, and a color filter layer 12 is formed to produce colored light within the pixel regions. Moreover, a common electrode 13 is formed on an entire surface of the upper substrate 10 including the black-matrix layer 11 and the color filter layer 12.

The lower substrate 20 is commonly called an array substrate, in which a plurality of thin film transistors, which serve as switching devices T, are disposed in a matrix configuration, and a plurality of gate and data lines 21 and 22 are formed to cross each other at the respective thin film transistors. In addition, the pixel region P includes a transmission part A and a reflective part R, wherein the transmission part A is an open area of a reflective electrode (not shown).

FIG. 2 is a cross sectional view of the transreflection-type LCD device of FIG. 1 according to the related art. In FIG. 2, the transreflection-type LCD device includes the upper substrate 10 having the common electrode 13 disposed thereon, and the lower substrate 20 having the pixel electrode 23. The pixel electrode 23 of the lower substrate 20 includes a transparent electrode 23a formed within portions corresponding to the transmission part A and the reflective part R, and on the reflective electrode 23b having the open area within the transmission part A. In addition, the liquid crystal layer 30 is formed between the upper and lower substrates 10 and 20, and a backlight 41 is provided below the lower substrate 20 to emit light during a transmission mode of the transflection-type LCD device.

When the transreflection-type LCD device is operated in a reflection mode, the ambient light or the front light is commonly used as the light source. Accordingly, the light B incident on the upper substrate 10 is reflected to the reflective electrode 23b, and then the light is transmitted to the liquid crystal layer 30 having liquid crystal molecules aligned by an electric field between the reflective electrode 23b and the common electrode 13. Thus, the light transmittance transmitting the liquid crystal layer 30 is controlled according to the alignment of the liquid crystal layer 30 to display an image.

During the transmission mode, the light F emitted from the backlight 41 provided below the lower substrate 20 is used as the light source. When the light F emitted from the backlight 41 is incident on the liquid crystal layer 30 through the transparent electrode 23a, the light transmittance is controlled by the alignment of the liquid crystal molecules in the liquid crystal layer 30. For example, the liquid crystal molecules are aligned by the electric field induced between the common electrode 13 and the transparent electrode 23a below a transmission hole to display an image.

FIG. 3 is an enlarged plan view of a pixel of a transreflection-type LCD device according to the related art. In FIG. 3, a unit pixel includes gate and data lines 21 and 22, a pixel electrode 23, and a thin film transistor T, wherein the gate and data lines 21 and 22 cross each other to define a pixel region. In addition, the pixel electrode 23 includes a transparent electrode 23a and a reflective electrode 23b within the pixel region, and the thin film transistor T is formed at the crossing point of the gate and data lines 21 and 22. The thin film transistor T includes a gate electrode 21a, a source electrode 22a, and a drain electrode 22b, and a scanning signal is supplied to the gate electrode 21a. In addition, the source electrode 22a protrudes from a portion of the data line 22 and receives video signals from the data line 22, and the drain electrode 22b is formed at a predetermined interval from the source electrode 22a to supply video signals to the pixel electrode 23. Then, a gate pad 31 and a source pad 32 are respectively formed at end portions of the gate line 21 and the data line 22 and are connected to drive ICs (not shown).

In FIG. 3, the pixel electrode 23 includes the transparent electrode 23a that is formed in portions corresponding to the transmission part A and the reflective part R, and on the reflective electrode 23b formed within the reflective part R, except for the transmission part A. Accordingly, the transparent electrode 23a is connected to the drain electrode 22b through a contact part C1 to receive the video signals. In addition, the reflective electrode 23b is formed to contact the transparent electrode 23a within the contact part C1 to which the video signals are supplied.

FIGS. 4A to 4H are cross sectional views along I-I', II-II', and III-III' of FIG. 3 of an array substrate fabrication process of a transreflection-type LCD device according to the related art. In FIGS. 4A to 4H, the line I-I' extends from a thin film transistor to a pixel region within a unit pixel region, the line II-II' includes a section of a gate pad, and the line III-III' includes a section of a source pad.

In FIG. 4A, a conductive metal layer is deposited on the transparent substrate 20, and is selectively removed using a first mask (not shown), thereby forming the plurality of gate lines 21 (in FIG. 3) and the gate electrodes 21a. Accordingly, as shown in FIG. 3, each gate line 21 includes a gate pad 31 at one end portion thereof, and the gate electrode 21a protrudes from the gate line 21. Subsequently, a first insulating layer 24, an amorphous silicon layer 25a, and an impurity layer (n+ layer) 25b are sequentially deposited on an entire surface of the transparent substrate 20.

In FIG. 4B, the impurity layer 25b and the amorphous silicon layer 25a are selectively removed using a second mask (not shown) to form an island-shaped semiconductor active layer 25 (later shown in FIG. 4C as semiconductor layer 35).

In FIG. 4C, a conductive metal layer is deposited on the transparent substrate 20 having the semiconductor layer 35, and is selectively removed using a third mask (not shown), thereby forming the plurality of data lines 22 (in FIG. 3) crossing the gate lines 21 (in FIG. 3), the source electrode 22a, and the drain electrode 22b. Accordingly, the source electrode 22a protrudes from each data line 22 (in FIG. 3) toward the semiconductor layer 35, and the drain electrode 22b is positioned at a predetermined interval from the source electrode 22a on the other side of the semiconductor layer 35. Subsequently, the impurity layer 25b of the semiconductor layer 35, which is exposed between the source and drain electrodes 22a and 22b, is removed using the source and drain electrodes 22a and 22b as a mask, thereby forming the semiconductor layer 35.

In FIG. 4D, an organic insulating layer is coated along an entire surface of the transparent substrate 20 including the data lines 22 (in FIG. 3), and exposure and developing processes are performed using a fourth mask (not shown) having a predetermined open area. Then, the organic insulating layer corresponding to the open area of the fourth mask is removed at a predetermined thickness. Then, a heat treatment is performed to form a first organic insulating layer 26a having embossing patterns at a portion of the organic insulating layer that is relatively thicker than the portion removed using the fourth mask. The organic insulating layer is formed of a positive-type organic insulating layer, such as Benzocyclobutene (BCB), or is formed of a positive-type material, such as photoacryl.

In FIG. 4E, a second organic insulating layer 26b having a constant thickness is coated on the first organic insulating layer 26a, wherein the second organic insulating layer 26b is formed of the same material as the first organic insulating layer 26a. Since the second organic insulating layer 26b is coated on the first organic insulating layer 26a at the constant thickness, it is possible to maintain the embossing patterns of the first organic insulating layer 26a after coating the second organic insulating layer 26b on the first organic insulating layer 26a.

In FIG. 4F, the first and second organic insulating layers 26a and 26b are selectively removed using a fifth mask (not shown) having a predetermined open area, thereby defining the contact part C1 that exposes a predetermined portion of the drain electrode 22b and defining the transmission part A. After selectively removing the first and second organic insulating layers 26a and 26b, the remaining first and second organic insulating layers 26a and 26b are referred to as a first passivation layer 26. When selectively removing the first and second organic insulating layers 26a and 26b, the first and second organic insulating layers 26a and 26b corresponding to the gate and source pads are removed to expose the gate insulating layer 24 and the source pad 32.

In FIG. 4G, a reflective metal layer is deposited along an entire surface of the first passivation layer 26, and is selectively removed using a sixth mask (not shown), whereby the reflective electrode 23b is formed in the pixel region except for the transmission part A and the first contact part C1. Next, an inorganic insulating layer 27 of SiNx is deposited along the entire surface of the lower substrate 20 including the reflective electrode 23b. For example, the inorganic insulating layer 27 is deposited on the lower substrate 20 at a high temperature of 300° C. or more. However, the embossing patterns of the first passivation layer 26 are destroyed by thermal flow.

In FIG. 4H, the inorganic insulating layer 27 is selectively removed at the first contact part C1, the second contact part C2, and the third contact part C3 using a seventh mask (not shown), thereby forming a second passivation layer 27a. Subsequently, a transparent metal layer is deposited along the entire surface of the lower substrate 20 including the second passivation layer 27a, and is selectively removed using an eighth mask (not shown). Thus, the transparent electrode 23a is formed within the pixel region including the transmission part A and the first contact part C1. In addition, a gate pad terminal 33a is formed in the second contact part C2 to be connected with the gate pad 31, and a source pad terminal 43a is formed in the third contact part C3 to be connected with the source pad 32.

According to the related art, the embossing patterns (or concave pattern) are formed of the organic insulating layer to improve reflexibility of the reflective electrode by increasing a surface area of the reflective electrode having the embossing patterns.

FIG. 5 is a photomicrograph showing a peeling phenomenon of a reflective electrode according to the related art. In FIG. 5, after forming the organic insulating layer having the embossing patterns, the reflective electrode is formed. Then, the inorganic insulating layer, such as SiNx, is deposited at a temperature of about 300° C. Accordingly, the peeling phenomenon occurs due to stress caused by inferior adhesion between the reflective electrode and the organic insulating layer.

According to the related art transreflection-type LCD device, the embossing pattern (i.e., the concave pattern) is formed using a positive-type organic insulating layer, such as Benzocyclobutene (BCB), or using a positive-type photoacryl to improve the reflexibility. However, when using the positive-type organic insulating layer, mask process steps for forming the embossing pattern of the organic insulating layer must be performed, as well as the other mask process steps for removing the transmission part. Thus, according to the related art, a dual-coating process is required during the process for forming the organic insulating layer, thereby complicating fabrication process steps.

For example, when forming the embossing pattern using BCB, it is difficult to perform the complicated fabrication process steps, thereby degrading the reflexibility of the reflective electrode. In addition, since the positive-type photoacryl has a transition glass temperature, the thermal flow is generated at the high process temperatures, thereby destroying the embossing pattern of the first passivation layer due to the thermal flow.

Moreover, after forming the organic insulating layer having the embossing pattern (i.e., the concave pattern), the reflective electrode is formed on the organic insulating layer. Then, the inorganic insulating layer, such as SiNx, is deposited thereon, and the transparent electrode is formed. Thus, when the passivation layer of SiNx is deposited at the high process temperatures, it may generate the peeling phenomenon due to stress from the inferior adhesion between the reflective electrode and the organic insulating layer.

SUMMARY OF THE INVENTION

Accordingly, the present invention is directed to a transreflection-type liquid crystal display (LCD) device and a method of fabricating a transreflection-type liquid crystal display (LCD) device that substantially obviates one or more problems due to limitations and disadvantages of the related art.

An object of the present invention is to provide a transreflection type LCD device and a method for manufacturing the same, which is formed in simplified manufacturing process steps with 6 masks since concave and/or convex patterns are formed in a negative type organic insulating layer in a stamp process without a mask.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described, a transreflection-type liquid crystal display (LCD) device includes a plurality of gate and data lines on a substrate crossing each other defining a plurality of pixel regions, a plurality of storage lines parallel to the gate lines, each storage line positioned between the gate lines, a plurality of thin film transistors disposed at the crossings of the gate and data lines, each thin film transistor having source and drain electrodes and a U-shaped channel region, a negative-type organic insulating layer within the pixel region except for a transmission part, the negative type organic insulating layer having at least one of concave and convex patterns thereon, a reflective electrode on the negative-type organic insulating layer within the pixel region except for the transmission part, and a transparent electrode within the pixel region in electrical contact with the drain electrode.

In another aspect, a method for fabricating a transreflection-type liquid crystal display (LCD) device includes forming a gate line and a storage line on a substrate using a first mask, forming a data line and a thin film transistor having source and drain electrodes using a second mask by depositing a semiconductor layer and a metal layer on the substrate including the gate line and the storage line, the data line being perpendicular to the gate line to define a pixel region, forming a negative-type organic insulating layer having at least one of concave and convex patterns therein using a third mask, the concave and convex patterns formed within the pixel region except for a transmission part, forming a reflective electrode on the negative-type organic insulating layer formed within the pixel region except for the transmission part, using a fourth mask, forming a contact hole on a drain electrode using a fifth mask, and forming a transparent electrode within the pixel region using a sixth mask to be connected with the drain electrode through the contact hole.

In another aspect, a method for fabricating a transreflection-type liquid crystal display (LCD) device includes forming a plurality of gate lines and a plurality of storage lines on a substrate, each gate line having a gate electrode protruding therefrom and each storage line is disposed between the gate lines in parallel to the gate lines, forming a plurality of data lines and a plurality of drain electrodes on the substrate, forming a semiconductor layer on a portion of the substrate including the gate lines, the plurality of data lines, and the plurality of drain electrodes, each data line perpendicular to the gate line on the semiconductor layer to define a pixel region, forming a negative-type organic insulating layer having at least one of concave and convex patterns along an entire surface of the substrate including the data lines, the negative-type organic insulating layer including a contact part and a transmission part therein, forming a reflective electrode corresponding to the pixel region except for the contact part and the transmission part, forming an inorganic insulating layer along an entire surface of the substrate except for the contact part, and forming a transparent electrode corresponding to the pixel region including the transmission part to be connected with the drain electrode within the contact part.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
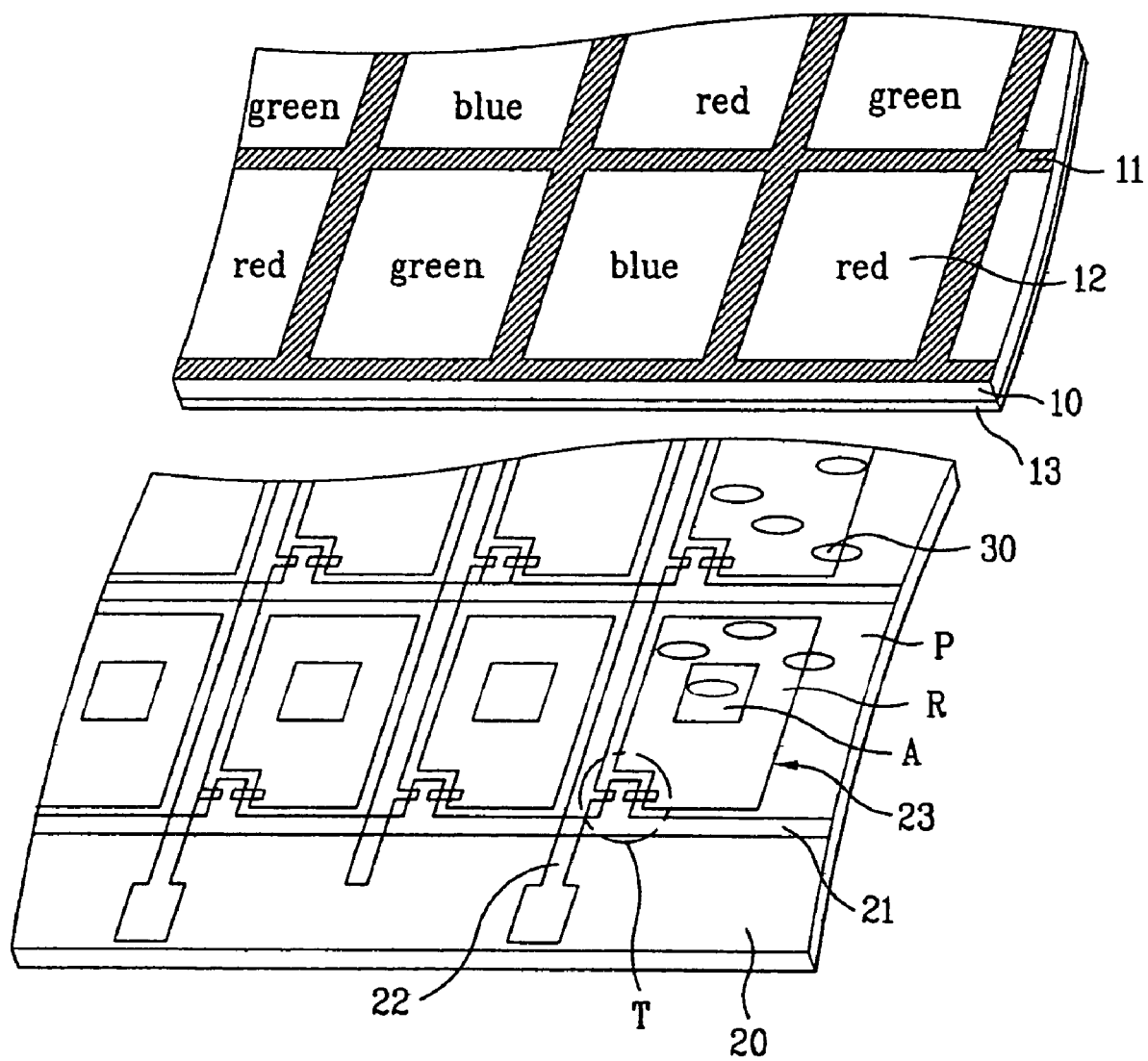
FIG. 1 is a perspective view of a transreflection-type LCD device according to the related art.
Figure 2:
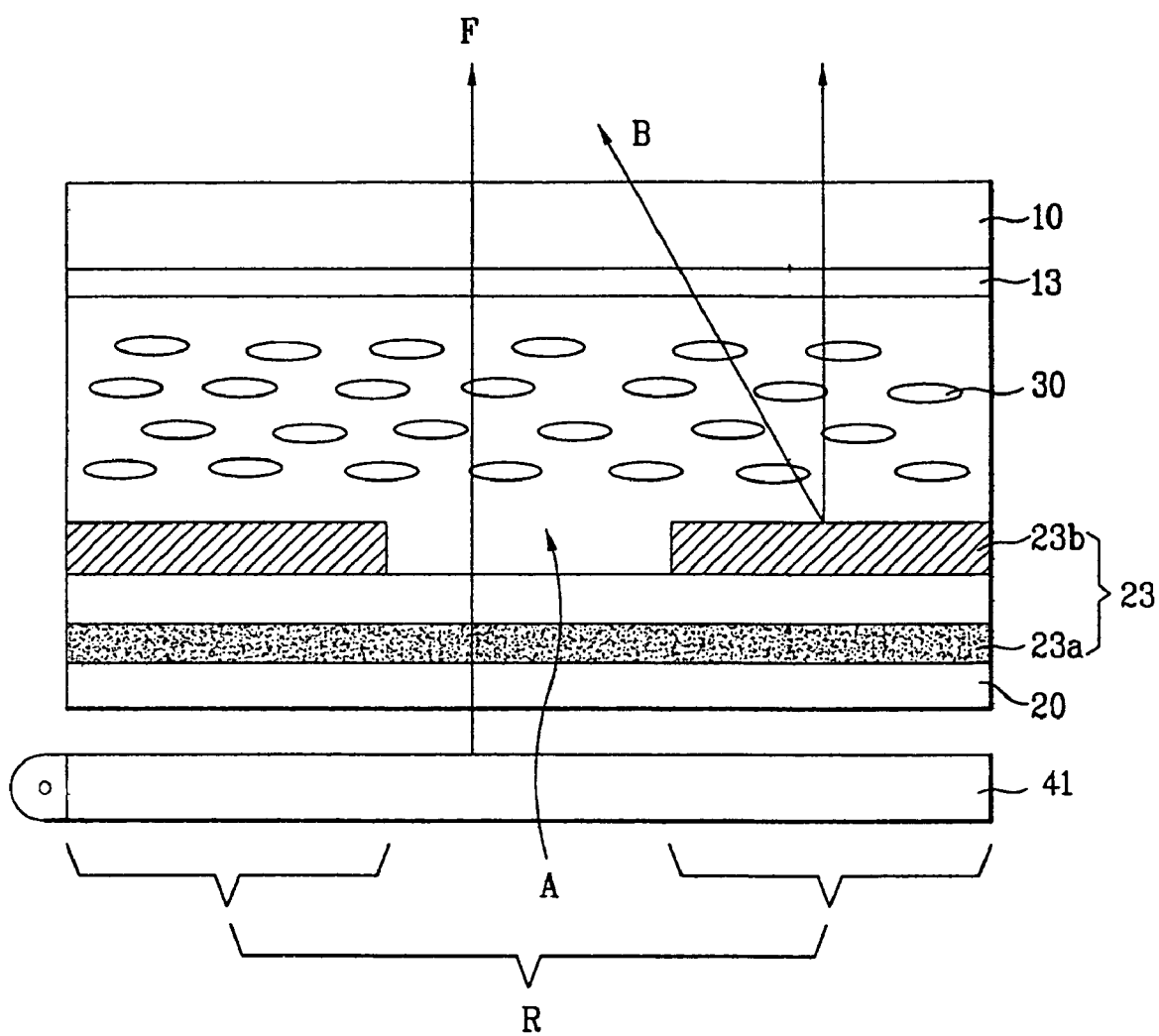
FIG. 2 is a cross sectional view of the transreflection-type LCD device of FIG. 1 according to the related art.
Figure 3:
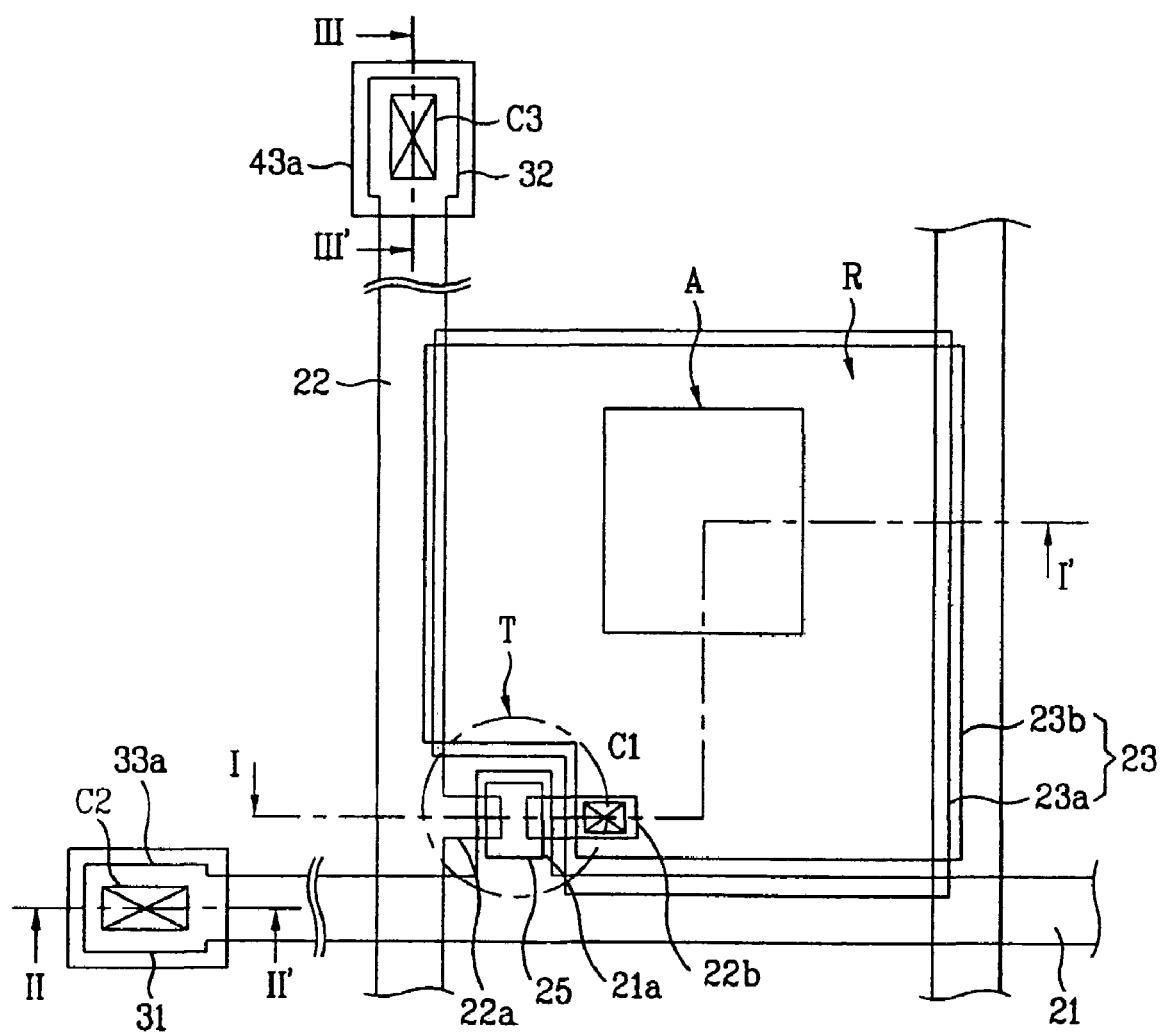
FIG. 3 is an enlarged plan view of a pixel of a transreflection-type LCD device according to the related art.
Figure 4A:
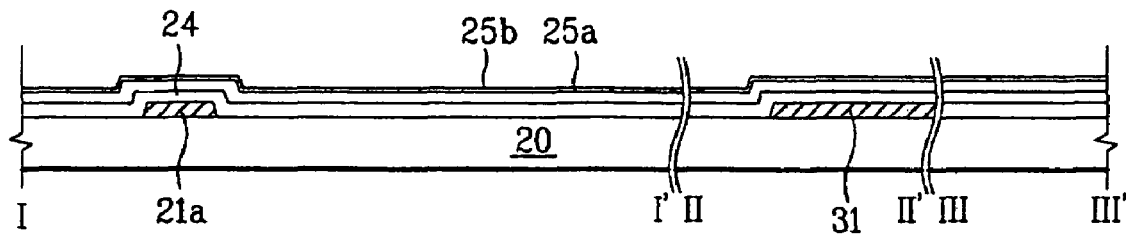
FIGS. 4A to 4H are cross sectional views along I-I', II-II', and III-III' of FIG. 3 of an array substrate fabrication process of a transreflection-type LCD device according to the related art.
Figure 4B:
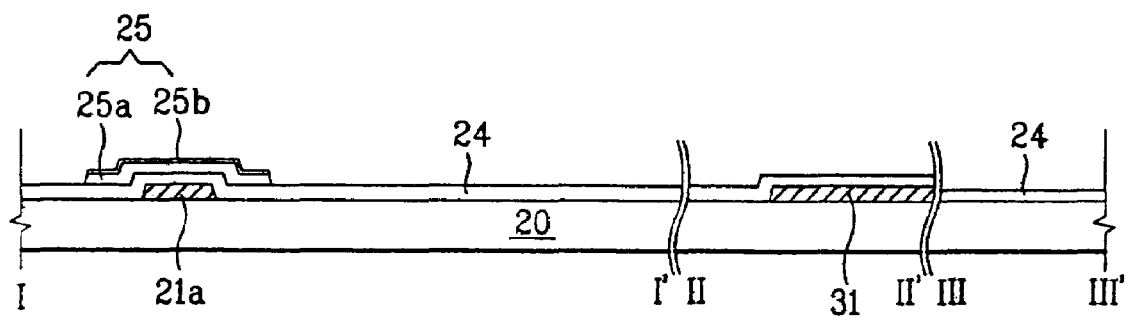
Figure 4C:
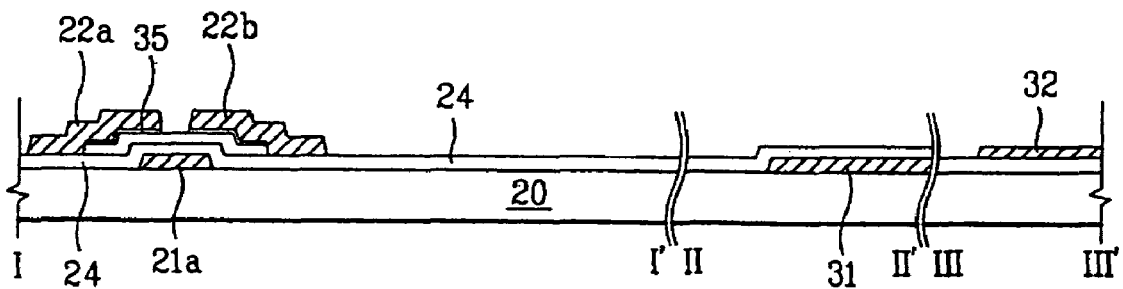
Figure 4D:
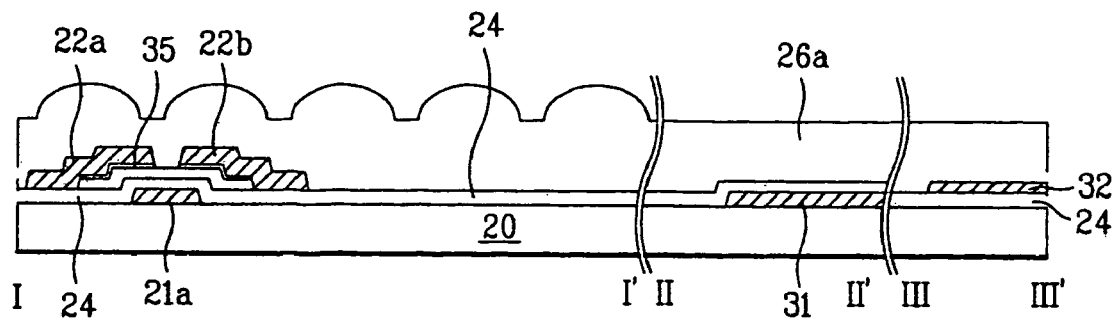
Figure 4E:
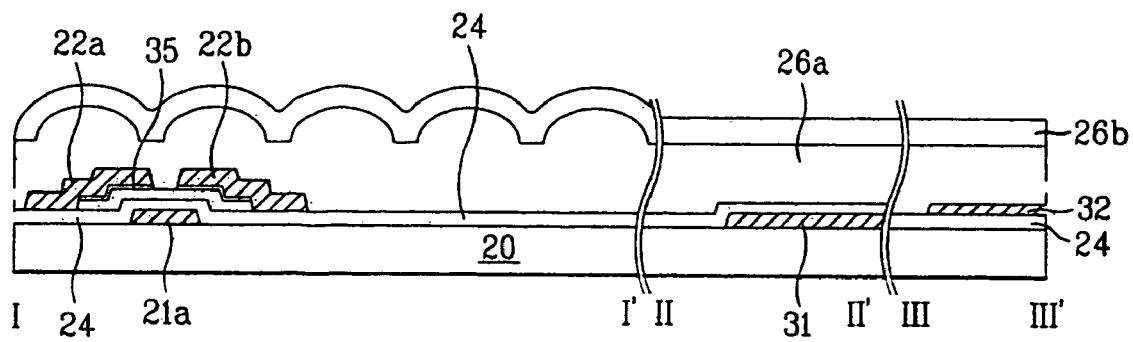
Figure 4F:
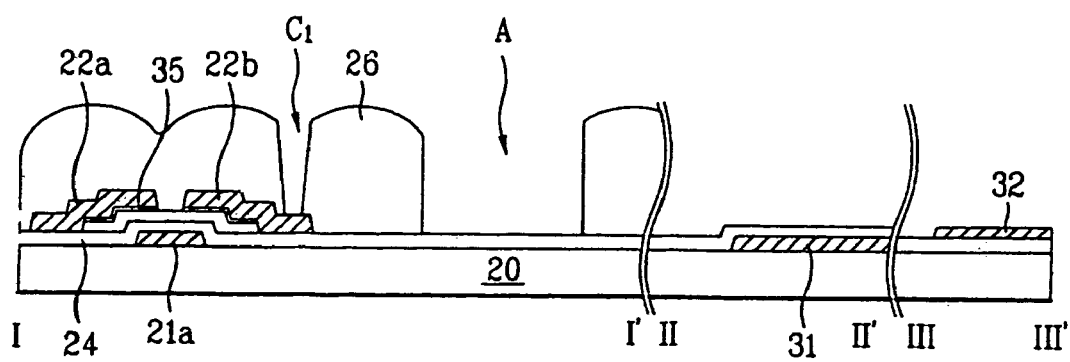
Figure 4G:
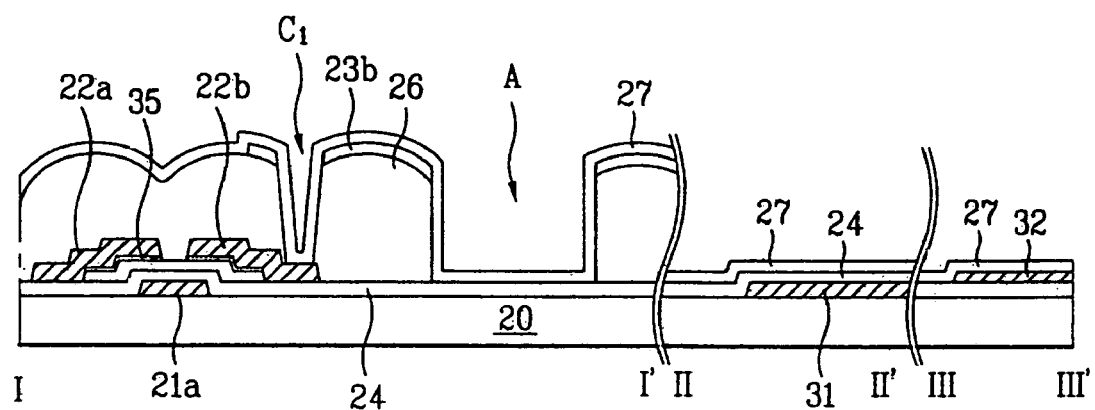
Figure 4H:
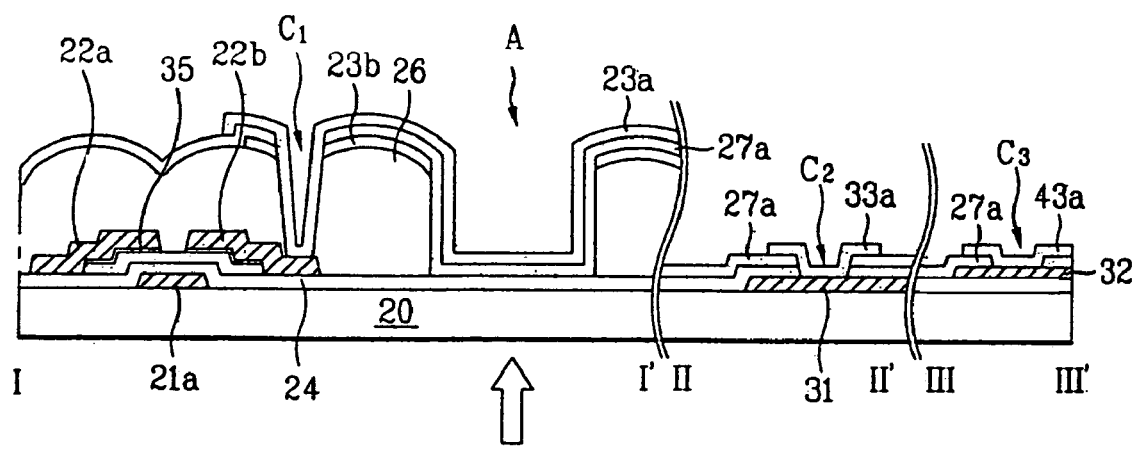
Figure 5:
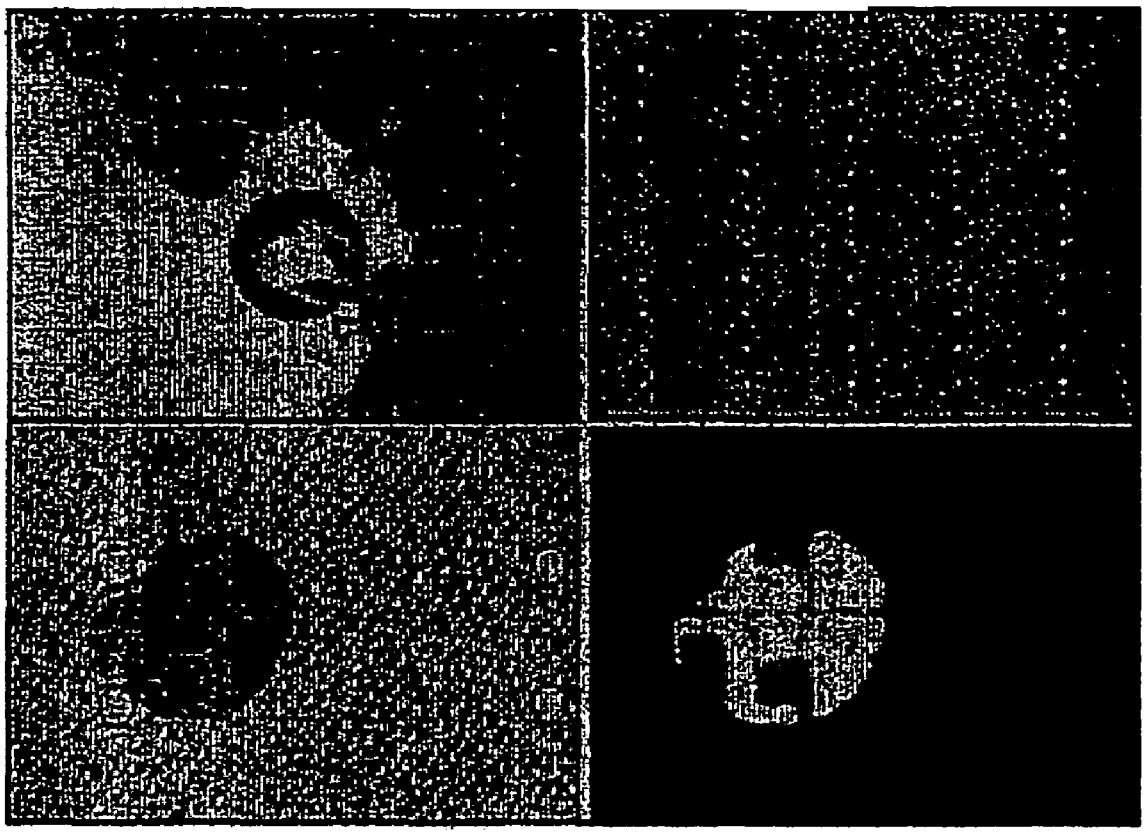
FIG. 5 is a photomicrograph showing a peeling phenomenon of a reflective electrode according to the related art.
Figure 6:
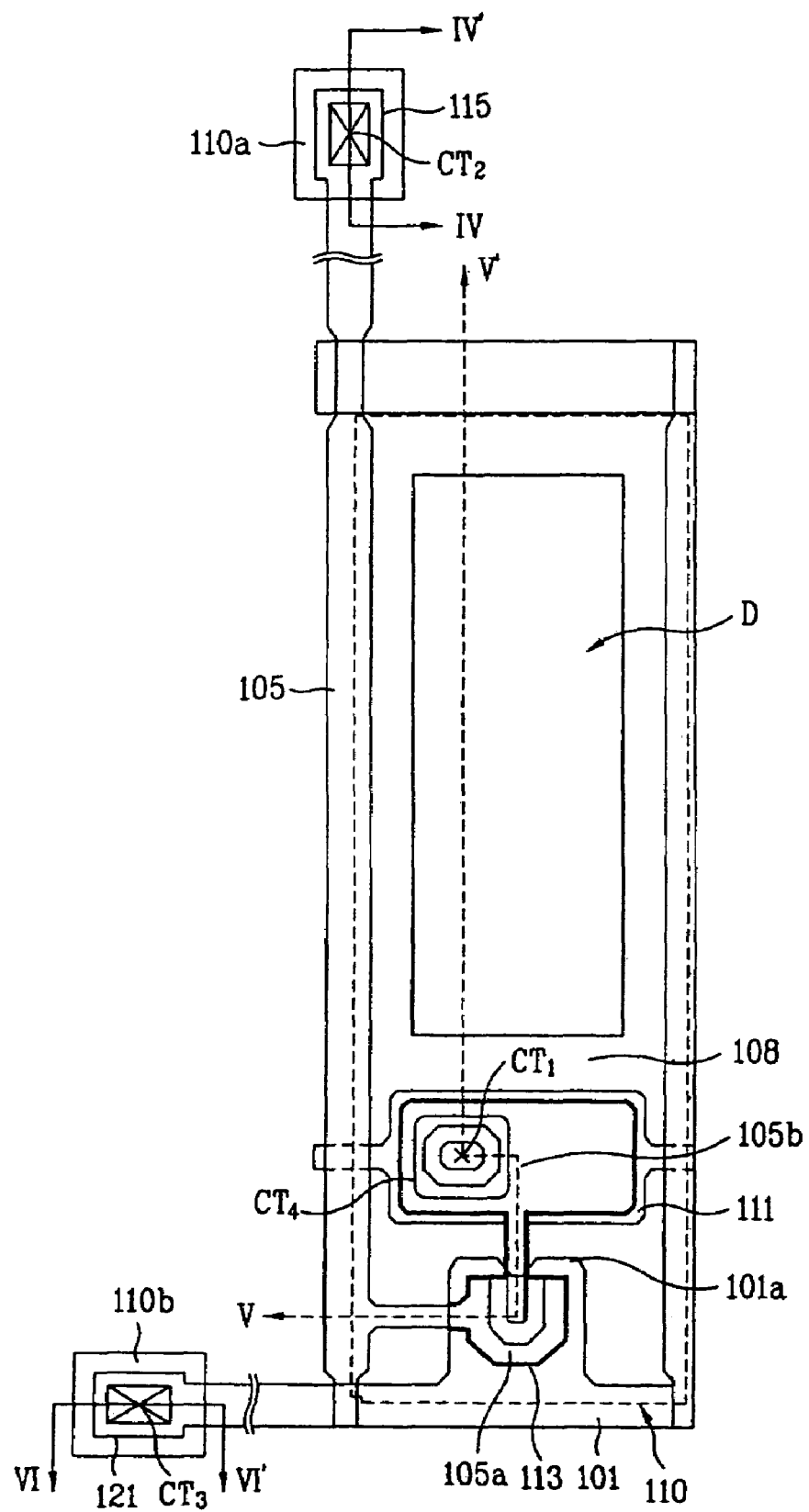
FIG. 6 is an enlarged plan view of an exemplary pixel of a transreflection-type LCD device according to the present invention.

FIG. 6 is an enlarged plan view of an exemplary pixel of a transreflection-type LCD device according to the present invention. In FIG. 6, a unit pixel of a trans-reflection type LCD device may include gate and data lines 101 and 105, a thin film transistor, a transparent electrode 110, and a reflective electrode 108, wherein the gate and data lines 101 and 105 may cross each other to define a pixel region and the thin film transistor may be formed at a crossing point of the gate and data lines 101 and 105. In addition, the transparent electrode 110 may be formed within the pixel region, and the reflective electrode 108 may have a transmission part D below the transparent electrode 110. Furthermore, a storage line 111 may be formed in parallel to the gate line 101, and may function as an electrode of a storage capacitor.

In FIG. 6, the thin film transistor may include a gate electrode 101a, a semiconductor layer 113, a source electrode 105a, and a drain electrode 105b, wherein scanning signals may be supplied to the gate electrode 101 through the gate line 101, and the semiconductor layer 113 may be formed to partially overlap the gate electrode 110a and the storage line 111. In addition, the source electrode 105a may protrude from a portion of the data line 105 that receives video signals from the data line 105, and the drain electrode 105b may be formed at an interval from the source electrode 105a to supply the video signals to the transparent electrode 110. Accordingly, the source electrode 105a may extend to the gate electrode 101a in a "U"-shaped to cover three sides of the gate electrode 101 within an opening along one side within the gate electrode 101. Then, the drain electrode 105b may extend to the source electrode 105a to overlap the storage line 111, and the extending portion of the drain electrode 105b may be spaced apart from the source electrode 105a. Thus, since the U-shaped source electrode 105a may surround the drain electrode 105b, a channel region may be increased.

The drain electrode 105b may be electrically connected to the transparent electrode 110 within a first contact part CT1. Then, a gate pad 121 and a source pad 115 may be formed at extended end portions of the gate line 101 and the data line 105, respectively, to be connected to drive ICs (not shown). For example, the gate pad 121 may be electrically connected to a transparent gate pad terminal 110b through a third contact part CT3, and the source pad 115 may be electrically connected to a transparent source pad terminal 110a through a second contact part CT2.

In FIG. 6, the gate pad 121 may be formed at one end portion extended from the gate line 101, wherein the gate pad 121 may be larger than the gate line 101. Similarly, the source pad 115 may be formed at one end portion extended from the data line 105, wherein the source pad 115 may be larger than the data line 105. In addition, the transparent electrode 110 may partially overlap the gate and data lines 101 and 105 along both sides of the pixel region, and the reflective electrode 108 may have a planar shape formed below the transparent electrode 110 to have an open area within the transmission part D.

FIGS. 7A to 7J are cross sectional views along IV-IV', V-V', and VI-VI' of an exemplary array substrate fabrication process steps of a transreflection-type LCD device according to the present invention. In FIGS. 7A to 7J, the line IV-IV' includes a section of a source pad D-Pad, the line V-V' includes a section from a data line D-Line to a gate line G-Line through a thin film transistor TFT and a storage capacitor Cst, and the line VI-VI' includes a section of a gate pad G-Pad.

Figure 7A:
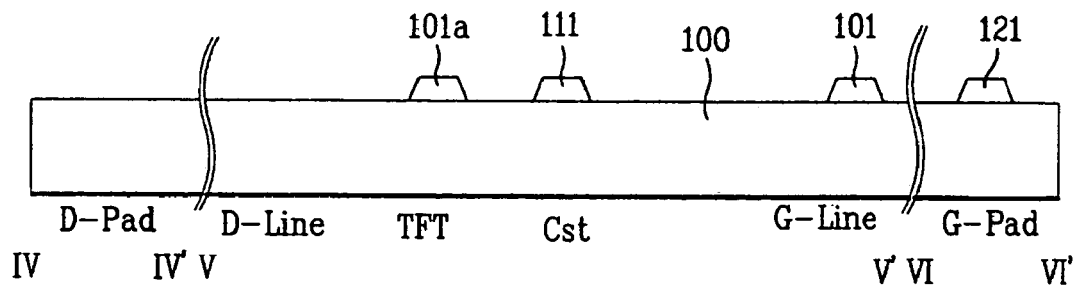
FIGS. 7A to 7J are cross sectional views along IV-IV', V-V', and VI-VI' of an exemplary array substrate fabrication process steps of a transreflection-type LCD device according to the present invention.

As shown in FIG. 7A, a conductive metal layer, such as Al, Cr, or MoW, may be deposited on a transparent substrate 100, and patterned using a first mask (not shown) to simultaneously form the gate pad 121 having one enlarged end portion, the gate line 101 extended from the gate pad 121 along a first direction, and the gate electrode 101a protruding from the gate line 101. In addition, the storage line 111 may be formed between the gate lines 101 to be parallel to the gate lines 101.

Figure 7B:
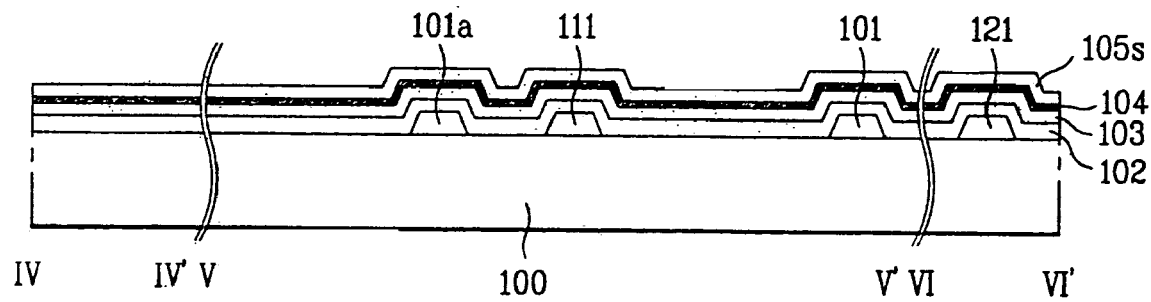

In FIG. 7B, a gate insulating layer 102, an amorphous silicon layer 103, an impurity layer ($n^+$ layer) 104, and source/drain metal layers 105s may be sequentially deposited along an entire surface of the transparent substrate 100 including the gate electrode 101a. The gate insulating layer 102 may include an inorganic insulating layer, such as $SiO_x$ or $SiN_x$. Then, the source/drain metal layers 105s may include conductive metal layers, such as Al, Cr, or MoW.

Figure 7C:
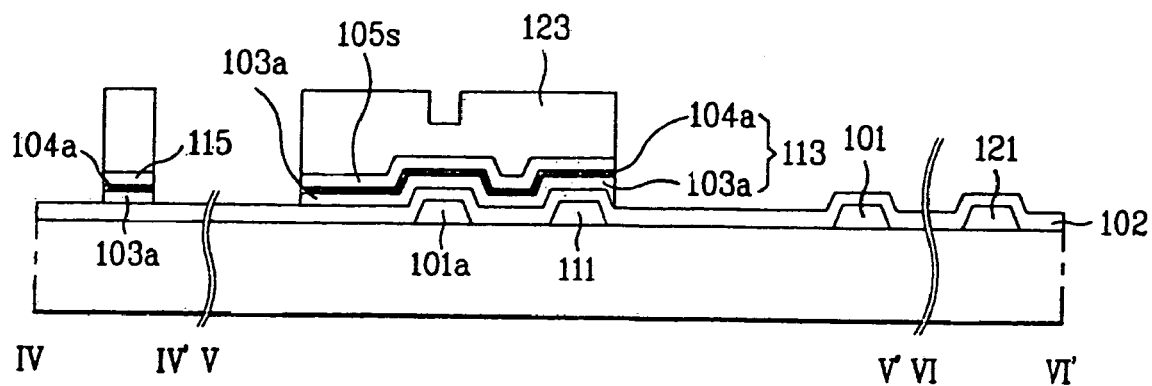

In FIG. 7C, a photo-resist layer 123 may be coated on the transparent substrate 100 including the source/drain metal layers 105s, and exposure and developing processes may be performed using a second mask (not shown) that may include a transmission part, a semi-transmission part, and a closed part. When performing the exposure and developing processes, the second mask (not shown) may be a diffraction mask. For example, the photo-resist layer 123 corresponding to the transmission part may be completely removed, and the photo-resist layer 123 corresponding to the semi-transmission part is removed at a predetermined thickness. In this case, the photo-resist layer 123 corresponding to the closed part may be maintained at the initial coating thickness.

In addition, the closed part may define a region for forming the source/drain electrodes and the data line, the semi-transmission part may define a channel region between the source and the drain electrodes, and the transmission part may define the remaining region. Thus, the source/drain metal layers 105s, which may correspond to the transmission part, the impurity layer 104a, and the amorphous silicon layer 103a may be removed first using the photo-resist layer 123 patterned using the second mask, thereby forming the source pad 115 and the data line 105 as a single body with the source/drain metal layers 105s, the amorphous silicon layer 103a, and the impurity layer 104. Within the gate pad portion, the source/drain metal layers 105s, the impurity layer 104, and the amorphous silicon layer 103 may be completely removed. In addition, the source pad 115 may be formed at one enlarged end portion of the data line 105.

Figure 7D:
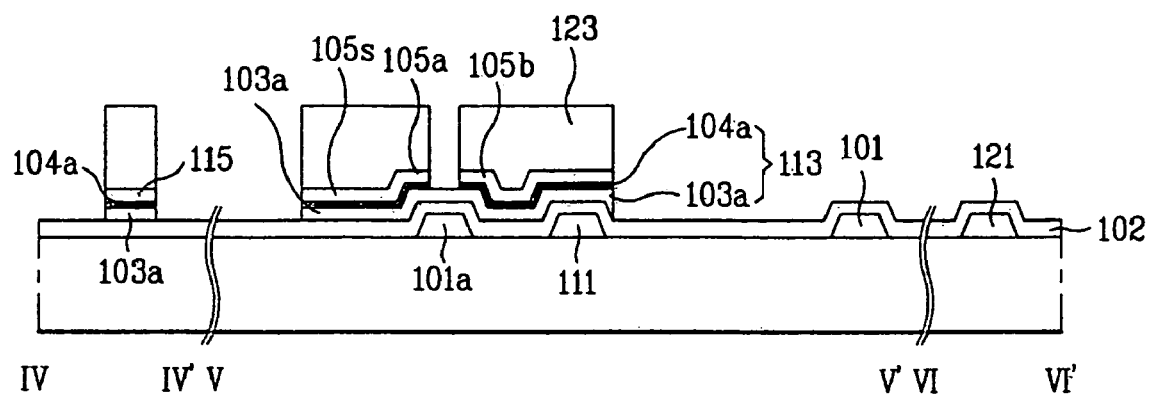

In FIG. 7D, after ashing the photo-resist layer 123 patterned using the second mask, the photo-resist layer 123 corresponding to the closed part and the semi-transmission part may be removed at the thickness corresponding to that of the semi-transmission part, whereby the photo-resist layer 123 of the semi-transmission part may be completely removed, and the photo-resist layer 123 may remain on the closed part. Then, the source/drain metal layers 105s corresponding to the semi-transmission part may be wet-etched using the patterned photo-resist layer 123 as a mask, thereby forming the source/drain electrodes 105a and 105b. Next, the impurity layer 104 may be dry-etched by using the photo-resist layer 123, thereby forming the semiconductor layer 113 including the amorphous silicon layer 103a and the impurity layer 104a. Accordingly, a channel region may be defined between the source electrode 105a and the drain electrode 105b, and the photo-resist layer 123 may be completely removed.

Figure 7E:
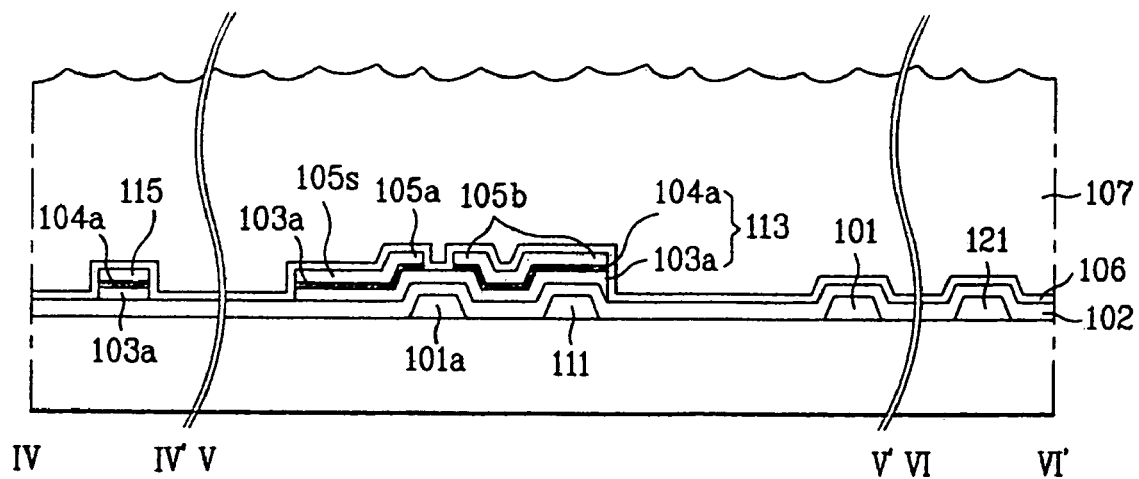

In FIG. 7E, a first passivation layer 106 of an inorganic insulating material, such as $SiN_x$ or $SiO_x$, may be deposited along the entire surface of the substrate 100 including the source/drain electrodes 105a and 105b. Then, a negative-type organic insulating layer 107 may be coated at a first thickness, and round-shaped concave patterns may be formed along an entire surface of the negative-type organic insulating layer 107 using a stamp process. Although the concave patterns may be formed on the surface of the negative type organic insulating layer according to the present invention, the embossing patterns may be formed on the surface of the negative-type organic insulating layer.

The stamp process may be performed using a stamp having patterns inverse to the round-shaped concave patterns of the negative-type organic insulating layer 107. For example, the negative-type organic insulating layer 107 may be formed according to a negative-type process in which the organic insulating layer 107 may be patterned to form the concave patterns according to embossing patterns of the stamp. Accordingly, the negative-type organic insulating layer 107 may be formed of negative photoacryl. Subsequently, a UV-curing process may be performed to the patterned negative-type organic insulating layer 107 to stably maintain the concave patterns of the negative-type organic insulating layer 107.

Figure 7F:
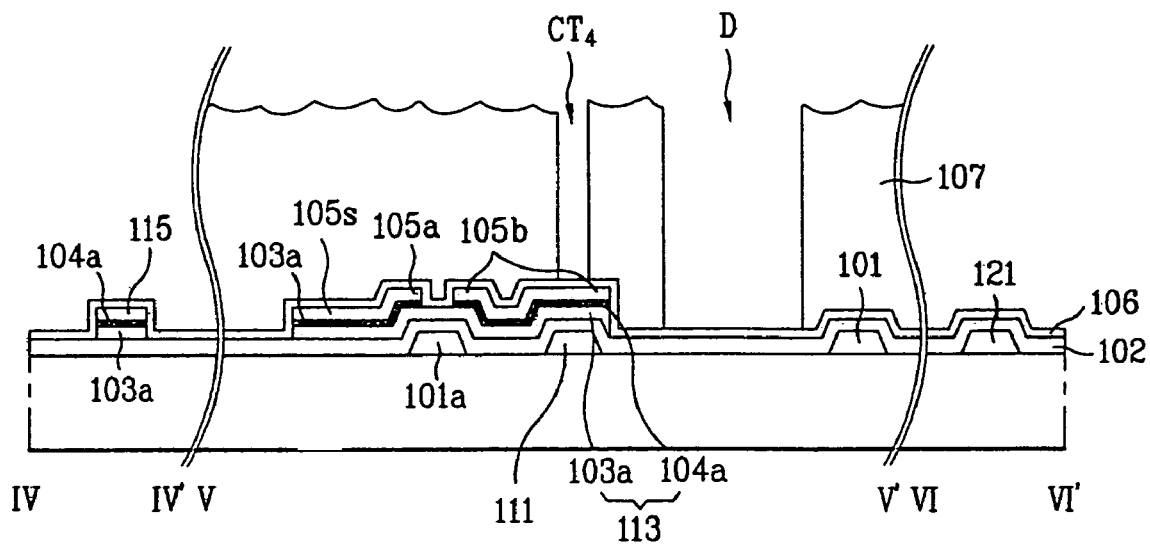

In FIG. 7F, the portions of the negative-type organic insulating layer 107 corresponding to the transmission part D, the upper part CT4 of the storage line 111, the upper part of the gate pad 121, and the upper part of the source pad 115 may be selectively removed according to a dry-etch process. Then, a re-curing process may be performed to the patterned negative-type organic insulating layer 107 at a temperature between about 160° C. and about 240° C. for a period of about 40 to about 80 minutes. In addition, the re-curing process may be performed at a temperature of about 220° C. for a period of about 60 minutes. Accordingly, the re-curing process may improve adhesion between the reflective electrode 108 and the negative-type organic insulating layer 107.

Figure 7G:
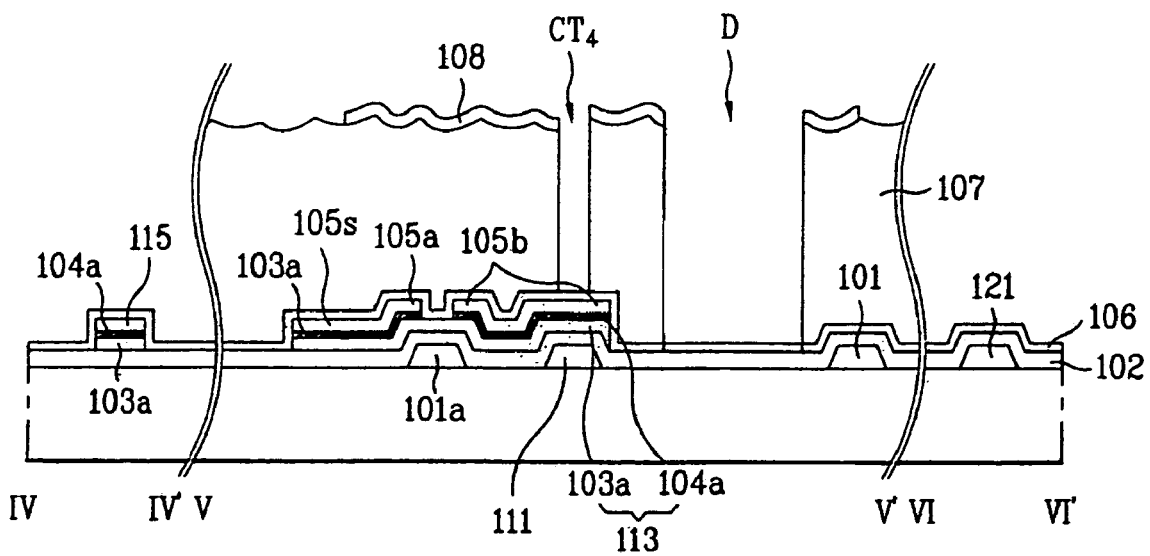

In FIG. 7G, a reflective metal layer, such as Al, Al alloy, Au, or Au alloy, may be deposited along an entire surface of the substrate 100 including the negative-type organic insulating layer 107, and may be selectively removed using a wet-etch process including a fourth mask (not shown). Accordingly, the reflective electrode 108 may be formed within the pixel region, except within the transmission part D and the upper part CT4 of the storage line 111.

Figure 7H:
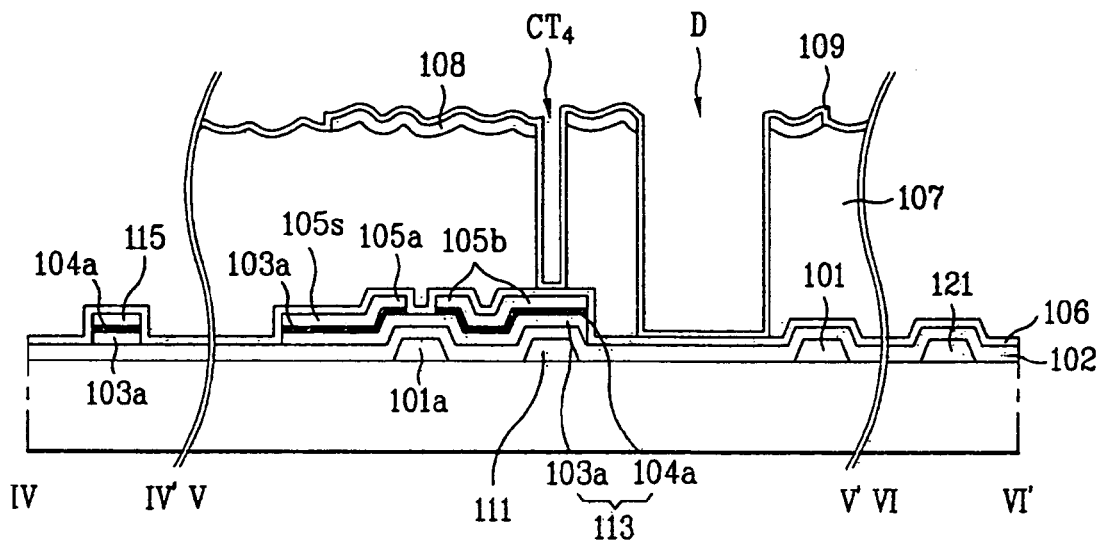

In FIG. 7H, a second passivation layer 109 of an inorganic insulating material, such as $SiN_x$ or $SiO_x$, may be deposited on the substrate 100 including the reflective the transparent electrode along an interface therebetween. Accordingly, the negative-type organic insulating layer 107 may be stably maintained at a temperature of about 240° C. In addition, the second passivation layer 109 nay be deposited on the negative-type organic insulating layer 107 at a temperature between about 180° C. and 220° C., thereby preventing destruction of the concave patterns on the surface of the negative-type organic insulating layer 107 and preventing occurrence of the peeling phenomenon. Moreover, the second passivation layer may be deposited on the negative-type organic insulating layer at a relatively low temperature of about 200° C., thereby stably maintaining the negative-type organic insulating layer 107 and the reflective electrode 108.

Figure 7I:
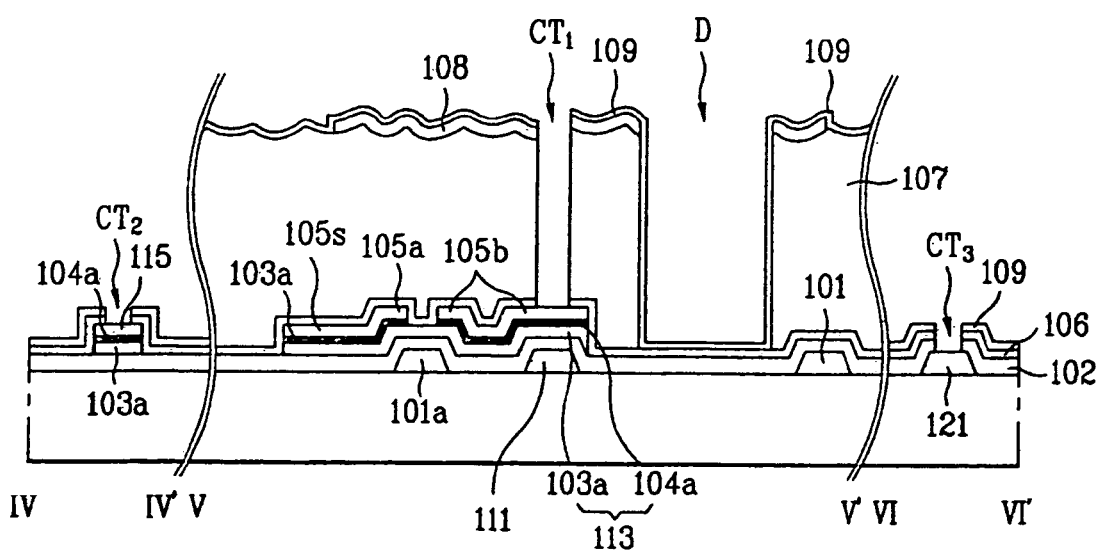

In FIG. 7I, the second passivation layer 109 may be selectively removed using a fifth mask (not shown), thereby forming the first contact part CT1 in the upper part of the storage line 111, and the second and third contact parts CT2 and CT3, which may function as contact parts of the gate pad and the source pad. Accordingly, the second contact part CT2 may be formed by removing the first passivation layer 106 and the second passivation layer 109 above the predetermined portion of the source pad 115 at a constant thickness, and the third contact part CT3 may be formed by removing the gate insulating layer 102 and the first passivation layer 106 at a constant thickness. Similarly, the first passivation layer 106 may be etched within the first contact part CT1, thereby exposing a portion of the drain electrode 105b.

Figure 7J:
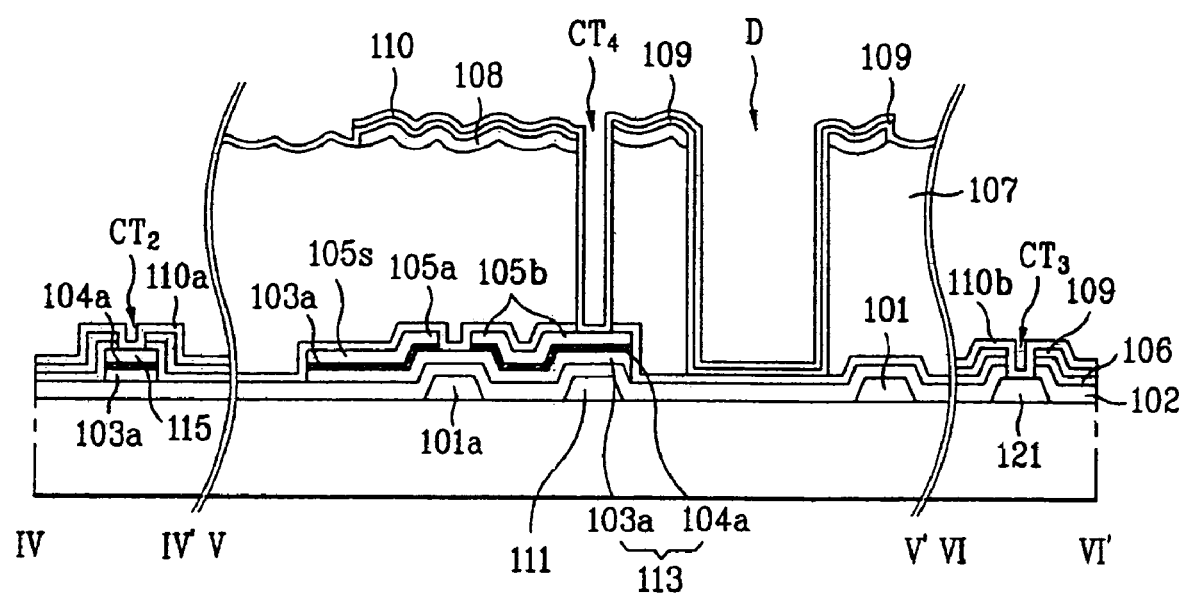

In FIG. 7J, a transparent metal layer, such as ITO (Indium-Tin-Oxide), IZO (Indium-Zinc-Oxide), or ITZO (Indium-Tin-Zine-Oxide), may be deposited on the substrate including the second passivation layer 109, and selectively removed using a sixth mask (not shown), thereby forming the transparent electrode 110 within the pixel region, the gate pad terminal 110b within the gate pad 121, and the source pad terminal 110a within the source pad 115. Accordingly, the transparent electrode 110 may contact the drain electrode 105b through the first contact part CT1, and the transparent electrode 110 may be formed within the pixel region including the transmission part D. In addition, the gate pad terminal 110b may contact the gate pad 121 through the third contact part CT3, and the source pad terminal 110a may contact the source pad 115 through the second contact part CT2.

Figure 8:
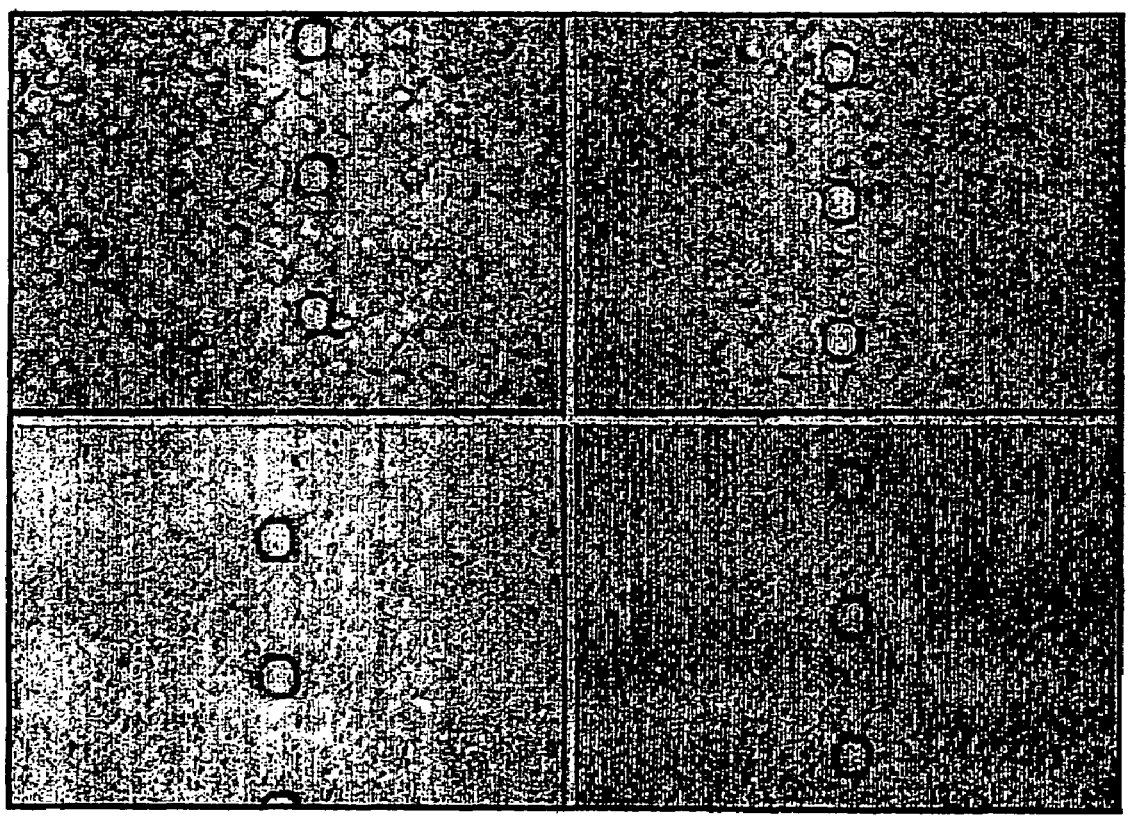
FIG. 8 is a photomicrograph of an exemplary pattern of a transreflection-type LCD device according to the present invention.

FIG. 8 is a photomicrograph of an exemplary pattern of a transreflection-type LCD device according to the present invention. In FIG. 8, after forming the reflective electrode in the trans-reflection type LCD device according to the present invention, the second passivation layer 109 may be deposited at a temperature between about 180° C. and about 220° C. that is lower than the temperature (i.e., 240° C.) at which the patterns of the negative-type organic insulating layer 107 may undergo the thermal flow phenomenon. Thus, it may be possible to maintain stabilization of the patterns of the negative-type organic insulating layer 107 after forming the second passvation layer 109, and may prevent occurrence of the peeling phenomenon. In addition, the transmission hole may be exposed within the pixel region.

According to the present invention, the fabrication process of the transreflection-type LCD device may be performed using six masks for patterning the gate electrode, the semiconductor layer, the source/drain electrodes, the negative type inorganic insulating layer, the reflective electrode, and the transparent electrode. Thus, fabrication of the transreflection-type LCD device according to the present invention decreases the number of the masks. In addition, the transreflection-type LCD device according to the present invention may include a semiconductor layer formed of amorphous silicon material or polysilicon-type material.

According to the present invention, the transreflection-type LCD device and method of fabricating a transreflection-type LCD device has the following advantages. First, the semiconductor layer and the source/drain electrodes may be formed using a diffraction mask, and the concave patterns of the negative-type organic insulating layer may be formed using a stamping process, whereby the number of the masks may be decreased to six, thereby making exposure and developing processes unnecessary.

Second, by using the negative-type organic insulating layer, the patterns may be formed during the stamping process instead of during the exposure and developing processes using the mask, whereby the round-shaped concave patterns may be formed without destruction of the patterns.

Third, after the stamping process of the negative-type organic insulating layer, UV light may be first irradiated thereto, and a re-curing process may be performed thereto after the etching process of the transmission part. In addition, the second passivation layer may be deposited at a relatively low temperature of about 200° C., thereby making it possible to stably maintain the round-shaped patterns of the negative-type organic insulating layer, the reflective electrode, and the transparent electrode without occurrence of the peeling phenomenon and causing destruction of the patterns.

Fourth, the concave patterns may be formed during the stamping process at a single time without use of a mask, thereby making a dual-coating process for the organic insulating layer unnecessary and simplifying the fabrication processing steps. By decreasing the number of mask process steps, it may be possible to decrease the number of exposure, developing, and etching processes, thereby improving yield.

It will be apparent to those skilled in the art that various modifications and variations can be made in transreflection-type liquid crystal display device and method of fabricating the same of the present invention without departing from the spirit or scope of the invention. Thus, it is intended that the present invention cover the modifications and variations of this invention provided they come within the scope of the appended claims and their equivalents.

What is claimed is:

1. A transreflection-type liquid crystal display (LCD) device, comprising:
   a plurality of gate and data lines on a substrate crossing each other defining a plurality of pixel regions;
   a plurality of storage lines parallel to the gate lines, each storage line positioned between the gate lines;
   a plurality of thin film transistors disposed at the crossings of the gate and data lines, each thin film transistor having source and drain electrodes and a U-shaped channel region;
   a negative-type organic insulating layer within the pixel region except for a transmission part, the negative type organic insulating layer having at least one of concave and convex patterns thereon;
   a reflective electrode on the negative-type organic insulating layer within the pixel region except for the transmission part;
   an inorganic passivation layer over the reflective electrode and the negative-type organic insulating layer; and
   a transparent electrode within the pixel region in electrical contact with the drain electrode.

2. The device according to claim 1, wherein each of the gate and data lines have a pad disposed at one extending end portion and includes a pad terminal formed of a same material as the transparent electrode.

3. The device according to claim 1, wherein the thin film transistor includes an active layer disposed beneath the data line and the source and drain electrodes.

4. The device according to claim 1, wherein the source electrode protrudes from each of the data lines and overlaps a gate electrode of the thin film transistor.

5. The device according to claim 1, wherein the negative-type organic insulating layer includes a negative-type photo-acryl.

6. The device according to claim 1, wherein the concave and convex patterns of the negative-type organic insulating layer are formed using a stamping process.

7. The device according to claim 1, wherein the passivation layer includes one of $SiO_x$ and $SiN_x$.

8. A method for fabricating a transreflection-type liquid crystal display (LCD) device, comprising:
   forming a plurality of gate lines and a plurality of storage lines on a substrate, each gate line having a gate electrode protruding therefrom and each storage line is disposed between the gate lines in parallel to the gate lines;
   forming a plurality of data lines and a plurality of drain electrodes on the substrate;
   forming a semiconductor layer on a portion of the substrate including the gate lines, the plurality of data lines, and the plurality of drain electrodes, each data line perpendicular to the gate line on the semiconductor layer to define a pixel region;
   forming a negative-type organic insulating layer having at least one of concave and convex patterns along an entire surface of the substrate including the data lines, the negative-type organic insulating layer including a contact part and a transmission part therein;
   forming a reflective electrode corresponding to the pixel region except for the contact part and the transmission part;
   forming an inorganic insulating layer along an entire surface of the substrate except for the contact part; and
   forming a transparent electrode corresponding to the pixel region including the transmission part to be connected with the drain electrode within the contact part.

9. The method according to claim 8, wherein the forming of the semiconductor layer, the source and drain electrodes and the data lines includes:
   depositing a gate insulating layer, an amorphous silicon layer, an impurity layer, a metal layer, and a photo-resist layer along an entire surface of the substrate including the gate lines;
   patterning the photo-resist layer to reduce a thickness portion of the photo-resist layer corresponding to a channel region of a thin film transistor by a diffraction exposure using a diffraction mask;
   etching the amorphous silicon layer, the impurity layer, and the metal layer using the patterned photo-resist layer as a mask;
   ashing the photo-resist layer to remove the portion corresponding to the channel region; and
   etching the metal layer and the impurity layer using the photo-resist layer as a mask.

10. The method according to claim 9, wherein the diffraction mask includes a closed part corresponding to portions for forming the data lines and the source and drain electrodes, and a semi-transmission part corresponding to a portion for forming the channel region.

11. The method according to claim 8, wherein the source electrode includes a U-shape.

12. The method according to claim 8, wherein the drain electrode overlaps the storage line.

13. The method according to claim 8, wherein the forming of the negative-type organic insulating layer includes:
   depositing a negative-type organic insulating material along an entire surface of the substrate including the data lines;
   patterning the at least one of the concave and convex patterns on the surface of the negative-type organic insulating layer to a predetermined thickness using a stamping method; and
   forming the contact part and the transmission part by selectively removing the negative-type organic insulating layer.

14. The method according to claim 13, further comprising hardening the negative-type organic insulating layer using UV light after the forming of the negative-type organic insulating layer.

15. The method according to claim 13, further comprising re-curing the negative-type organic insulating layer after the selectively removing of the contact part and the transmission part of the negative-type organic insulating layer.

16. The method according to claim 15, wherein the re-curing process is performed at a temperature between about 160 EC and about 240 EC during a period of about 40 to about 80 minutes.

17. The method according to claim 8, wherein the negative-type organic insulating layer includes a negative-type photo-acryl.

18. The method according to claim 8, wherein the inorganic insulating layer includes one of $SiO_x$ and $SiN_x$.

19. The method according to claim 8, wherein the inorganic insulating layer is formed at a temperature between about 180 EC and about 220 EC.

20. The method according to claim 8, further comprising:
    forming an inorganic insulating layer on the substrate before forming the negative-type organic insulating layer.

* * * * *